United States Patent
Nakagomi

(10) Patent No.: US 10,192,308 B2
(45) Date of Patent: Jan. 29, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keita Nakagomi, Kyoto (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/480,497

(22) Filed: Apr. 6, 2017

(65) Prior Publication Data

US 2017/0301091 A1  Oct. 19, 2017

(30) Foreign Application Priority Data

Apr. 13, 2016 (JP) ................. 2016-080479

(51) Int. Cl.
| | |
|---|---|
| G06K 9/00 | (2006.01) |
| G06T 7/00 | (2017.01) |
| G06T 7/11 | (2017.01) |
| G06T 7/136 | (2017.01) |
| G01C 22/00 | (2006.01) |

(52) U.S. Cl.
CPC ............ *G06T 7/0014* (2013.01); *G06T 7/11* (2017.01); *G06T 7/136* (2017.01); *G06T 2207/10081* (2013.01); *G06T 2207/20021* (2013.01); *G06T 2207/30004* (2013.01); *G06T 2207/30008* (2013.01); *G06T 2210/41* (2013.01)

(58) Field of Classification Search
CPC ................... G06T 7/00; G06K 9/00

USPC ....... 382/128, 129, 130, 131, 132, 133, 134; 701/28
See application file for complete search history.

(56) References Cited

U.S. PATENT DOCUMENTS

| | | | |
|---|---|---|---|
| 8,538,127 B2* | 9/2013 | Sakanaga ............... | G06K 9/36 |
| | | | 348/125 |
| 9,407,794 B2* | 8/2016 | Aizaki .................... | H04N 1/50 |
| 9,589,391 B2* | 3/2017 | Sakuragi ................ | G06T 19/20 |

OTHER PUBLICATIONS

Emoto et al., "Possibility of Personal Identification by Torso CT Images Using Histograms", The 17th IyouGazouNinch Kenkyukai Program, proceeding, Aug. 29, 2015, p. 10.

* cited by examiner

*Primary Examiner* — Abolfazl Tabatabai
(74) *Attorney, Agent, or Firm* — Rossi, Kimms & McDowell LLP

(57) ABSTRACT

An image processing apparatus comprising: a division unit configured to divide, into a plurality of partial regions, a region of interest obtained from each of cross sections of a first image and a second image; a statistic information calculation unit configured to calculate statistic information of pixels included in the partial region; a degree-of-coincidence calculation unit configured to calculate a degree of coincidence between the pieces of statistic information for a partial region in the first image and a partial region in a pair of cross-sectional positions in the first image and the second image; and a specifying unit configured to specify positions of corresponding cross sections between the first image and the second image based on comparison between evaluation values each obtained by integrating the degrees of coincidence over all of the plurality of partial regions.

22 Claims, 12 Drawing Sheets

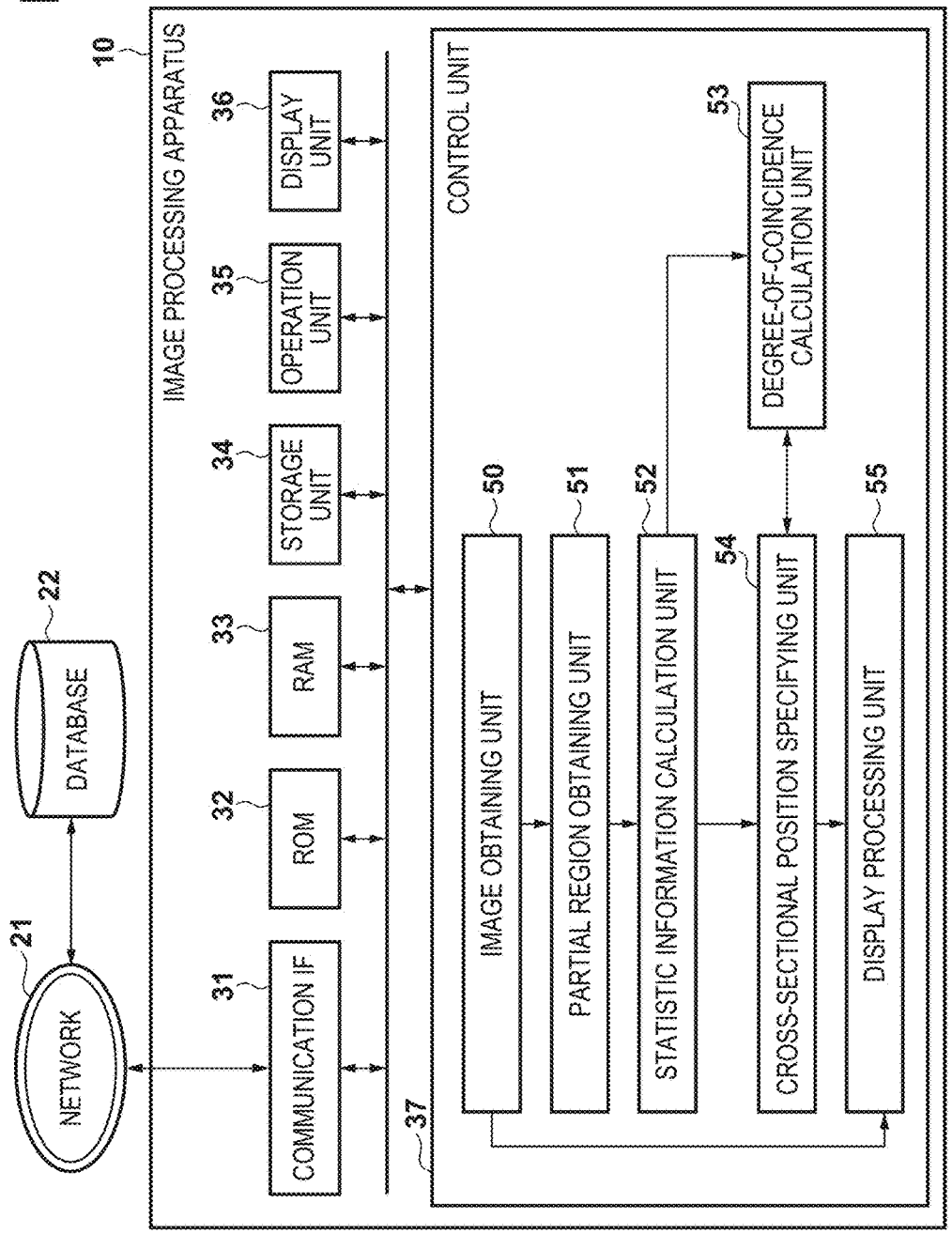

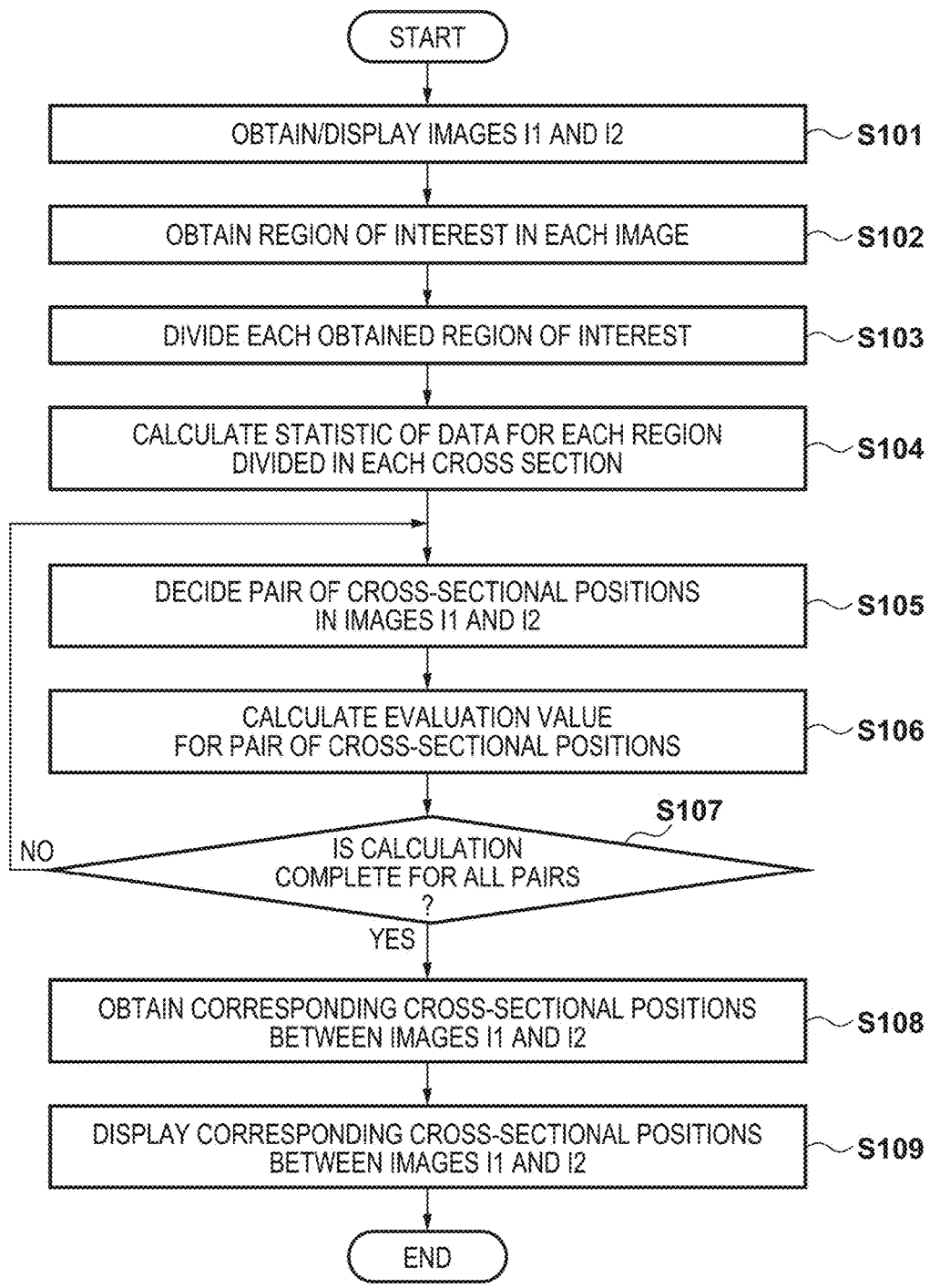

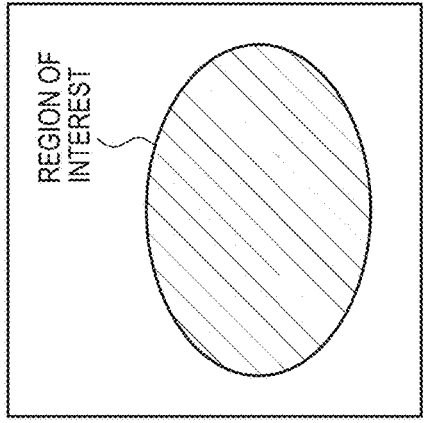
F I G. 5A  IMAGE I1
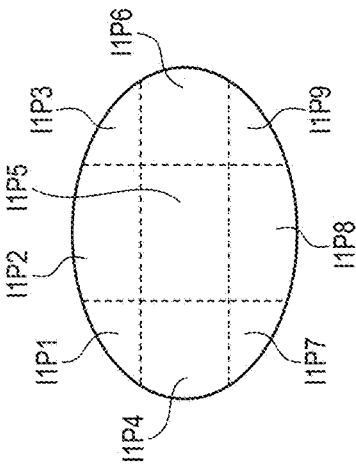
F I G. 5B  RESULT OF OBTAINING REGION OF INTEREST
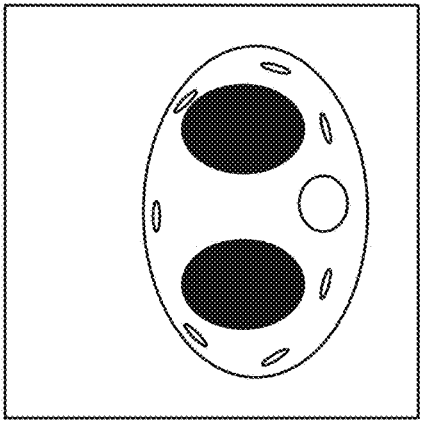
F I G. 5C  DIVISION AT PREDETERMINED RATIO
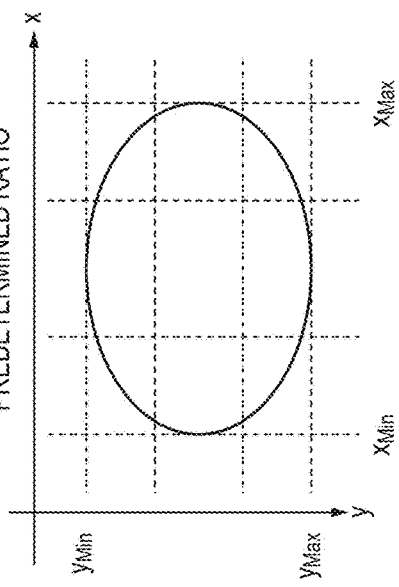
F I G. 5D  RESULT OF DIVIDING REGION OF INTEREST

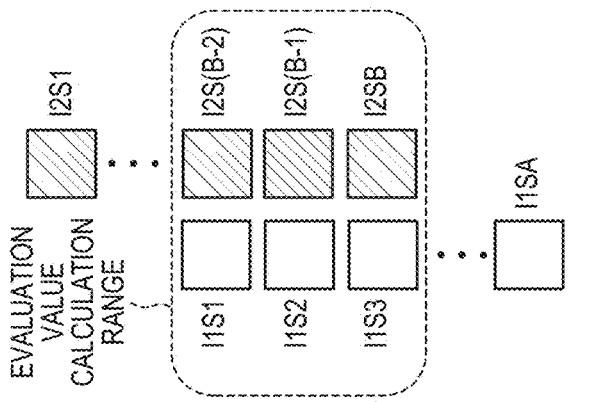
FIG. 9A — EXAMPLE 1 OF EVALUATION VALUE CALCULATION RANGE
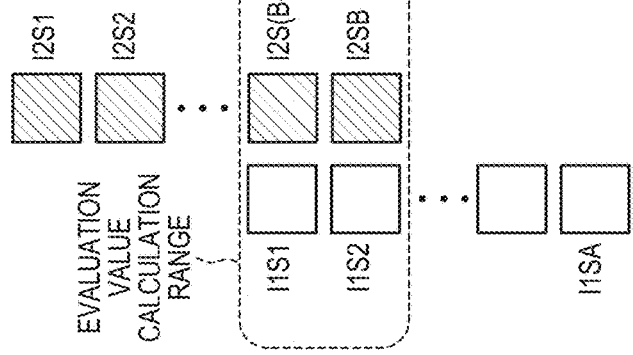
FIG. 9B — EXAMPLE 2 OF EVALUATION VALUE CALCULATION RANGE
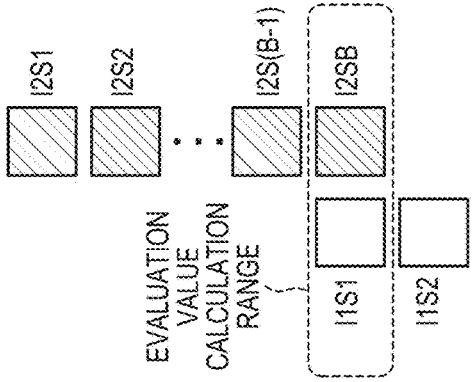
FIG. 9C — EXAMPLE 3 OF EVALUATION VALUE CALCULATION RANGE

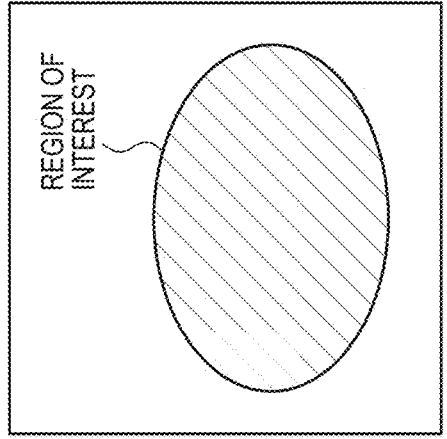
FIG. 11B RESULT OF OBTAINING REGION OF INTEREST
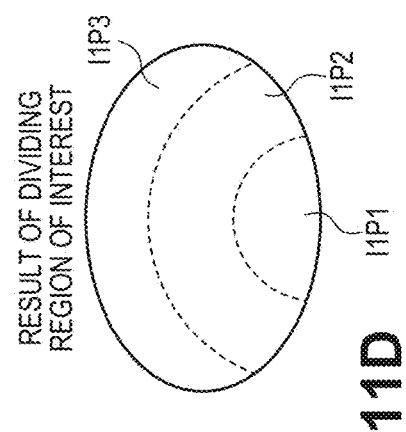
FIG. 11D RESULT OF DIVIDING REGION OF INTEREST
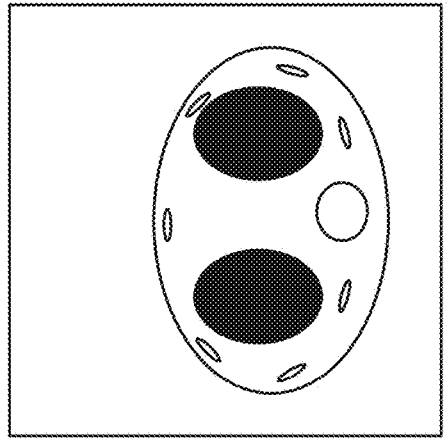
FIG. 11A IMAGE I1
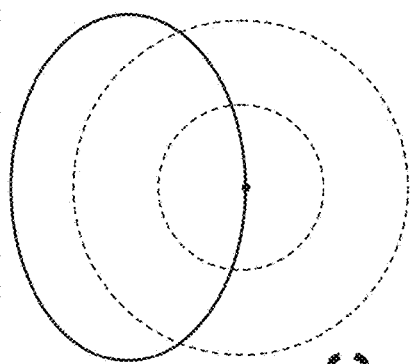
FIG. 11C DIVISION IN ACCORDANCE WITH DISTANCE FROM GIVEN POINT

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

In the medical field, a doctor performs diagnosis by observing medical images obtained by various types of medical imaging apparatuses (modalities) such as a CT apparatus and MRI apparatus. To capture a change in condition of a subject with time from images, images captured by the same modality at different timings are compared.

To compare two images, it is necessary to register corresponding positions (pixels) between the images. As a registration method, there is known an image deformation registration method such as affine transformation or FFD (Free Form Deformation). Many deformation registration methods are based on a finite repetitive operation, and may provide a local solution (cannot reach an optimal solution), thereby causing the initial value in the operation to influence the accuracy of the final image deformation result.

When performing deformation registration between two images, it is necessary to roughly obtain corresponding positions between the images so that parts in the images, which include the same portion, are to be processed, and provide the corresponding positions as initial values. Non-patent literature 1 (Yutaka Emoto, "Possibility of Personal Identification by Torso CT Images Using Histograms", The 17th IyouGazouNinch Kenkyukai Program, proceeding, Aug. 29, 2015, p. 10) discloses a method of obtaining the similarity between images by histogram matching for each pair of cross sections of two images, and obtaining corresponding positions having the highest similarity.

In the technique described in non-patent literature 1, however, even if different object portions are captured, if cross sections have similar histograms as a whole, wrong cross sections of two images may be associated with each other.

The present invention has been made in consideration of the above problem, and provides a technique of specifying the positions of corresponding cross sections between two images.

SUMMARY OF THE INVENTION

According to one aspect of the present invention, there is provided an image processing apparatus comprising: a division unit configured to divide, into a plurality of partial regions, a region of interest obtained from each of cross sections of a first image and a second image, each of which has a plurality of cross sections; a statistic information calculation unit configured to calculate, for each of the cross sections of the first image and the second image and each of the partial regions, statistic information of pixels included in the partial region; a degree-of-coincidence calculation unit configured to calculate a degree of coincidence between the pieces of statistic information for a partial region in the first image and a partial region, corresponding to the partial region, in the second image, in a pair of cross-sectional positions in the first image and the second image; and a specifying unit configured to specify positions of corresponding cross sections between the first image and the second image based on comparison between evaluation values each obtained by integrating the degrees of coincidence over all of the plurality of partial regions.

According to another aspect of the present invention, there is provided an image processing method comprising: dividing, into a plurality of partial regions, a region of interest obtained from each of cross sections of a first image and a second image, each of which has a plurality of cross sections; calculating, for each of the cross sections of the first image and the second image and each of the partial regions, statistic information of pixels included in the partial region; calculating a degree of coincidence between the pieces of statistic information for a partial region in the first image and a partial region, corresponding to the partial region, in the second image, in a pair of cross-sectional positions in the first image and the second image; and specifying positions of corresponding cross sections between the first image and the second image based on comparison between evaluation values each obtained by integrating the degrees of coincidence over all of the plurality of partial regions.

According to the present invention, it is possible to specify the positions of corresponding cross sections between two images. That is, it is possible to specify the positions of corresponding cross sections between the first and second images by calculating the degree of coincidence between pieces of statistic information of corresponding partial regions in the first and second images, and comparing evaluation values each obtained by integrating the degrees of coincidence over all of the plurality of partial regions.

Further features of the present invention will become apparent from the following description of exemplary embodiments (with reference to the attached drawings).

BRIEF DESCRIPTION OF THE DRAWINGS

FIG. 1 is a block diagram showing the functional arrangement of an image processing apparatus according to an embodiment;

FIG. 3 is a flowchart illustrating an example of the processing procedure of the image processing apparatus;

FIGS. 5A to 5D are views showing an example of a result of obtaining the region of interest included in the image and an example of division of the region of interest at a predetermined ratio;

FIGS. 9A to 9C are views each showing an example of a calculation range when evaluating the degree of coincidence between the two images;

FIGS. 11A to 11D are views showing an example of a result of obtaining the region of interest included in the image and an example of division of the region of interest in accordance with a distance from a given pixel included in the image.

DESCRIPTION OF THE EMBODIMENTS

Figure 2A:
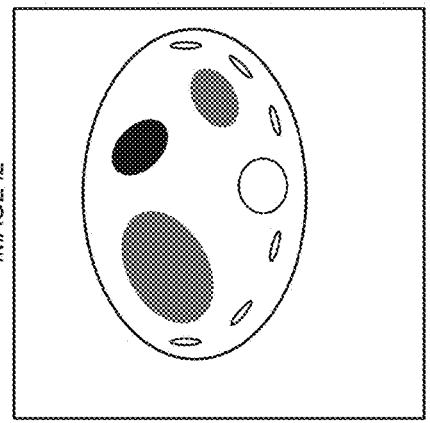
FIGS. 2A to 2D are views showing examples of division of regions of interest included in images.
Figure 2B:
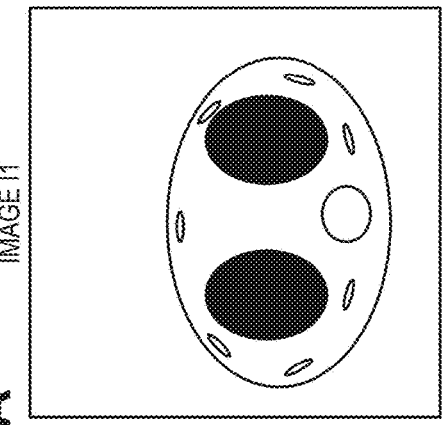

Embodiments of the present invention will now be exemplarily described in detail with reference to the accompanying drawings. Note that the constituent elements described in the embodiments are merely examples. The technical scope of the present invention is determined by the scope of claims and is not limited by the following individual embodiments.

An image processing apparatus according to an embodiment specifies the positions (to be referred to as corresponding cross-sectional positions hereinafter) of corresponding cross sections between two three-dimensional images (images I1 and I2) each having a plurality of cross sections. During the process of obtaining the corresponding cross-sectional positions, the image processing apparatus obtains a region of interest from each of the images I1 and I2, and divides the region of interest into a plurality of partial regions at a predetermined ratio. After that, the image processing apparatus associates, with each other, the partial regions between the images I1 and I2, calculates the degree of coincidence between the statistics (for example, histograms) of pixel values included in the respective partial regions, and calculates the average of the degrees of coincidence for all the partial regions. The image processing apparatus according to the embodiment is characterized by calculating the average of the degrees of coincidence for all candidates of corresponding cross-sectional positions in two images, and specifying (calculating) corresponding cross sections based on the best evaluation value. In the technique of the image processing apparatus according to this embodiment, when calculating the degree of coincidence between the pieces of statistic information (statistics) of pixel values, a restriction is imposed on the location of a pixel having a given pixel value, and thus corresponding cross-sectional positions can be specified (calculated) stably more than the conventional technique. An arrangement and processing according to this embodiment will be described below with reference to FIG. 1.

FIG. 1 is a block diagram showing an example of an image processing system (medical image processing system) including the image processing apparatus according to this embodiment. The image processing system includes, as its functional components, an image processing apparatus 10, a network 21, and a database 22. The image processing apparatus 10 is communicably connected to the database 22 via the network 21. The network 21 includes, for example, a LAN (Local Area Network) and a WAN (Wide Area Network).

The database 22 holds and manages medical images and pieces of information associated with the medical images. The image processing apparatus 10 obtains the medical image in the database 22 via the network 21. The image processing apparatus 10 can obtain, via the network 21, the medical image held in the database 22. The image processing apparatus 10 includes a communication IF (interface) 31 (communication unit), a ROM (Read Only Memory) 32, a RAM (Random Access Memory) 33, a storage unit 34, an operation unit 35, a display unit 36, and a control unit 37.

The communication IF 31 (communication unit) is formed by a LAN card or the like, and implements communication between an external apparatus (for example, the database 22 or the like) and the image processing apparatus 10. The ROM 32 is formed by a nonvolatile memory or the like, and stores various programs. The RAM 33 is formed by a volatile memory or the like, and temporarily stores various kinds of information as data. The storage unit 34 is formed by an HDD (Hard Disk Drive) or the like, and stores various kinds of information as data. The operation unit 35 is formed by a keyboard and mouse, a touch panel, or the like, and inputs instructions from the user (for example, a doctor) to various apparatuses.

The display unit 36 is formed by a display or the like, and displays various kinds of information to the user. The control unit 37 is formed by a CPU (Central Processing Unit) or the like, and comprehensively controls processing in the image processing apparatus 10. The control unit 37 includes, as its functional components, an image obtaining unit 50, a partial region obtaining unit 51, a statistic information calculation unit 52, a degree-of-coincidence calculation unit 53, a cross-sectional position specifying unit 54, and a display processing unit 55.

In the image processing apparatus according to this embodiment, the image obtaining unit 50 obtains the first and second images by capturing an object. The first and second images are images captured at different timings. The image obtaining unit 50 obtains the first image (image I1) and the second image (image I2) from the database 22. These images are images (medical images) of the object, which are obtained by various modalities. This embodiment will describe an example in which the medical images are CT images of the same object captured at different dates and times. However, the medical images need not be images obtained by capturing the same object. Furthermore, the medical images may be another kind of three-dimensional images other than CT images, such as MRI images, ultrasonic images, PET images, or OCT images. This embodiment is applicable regardless of the kind of images.

The partial region obtaining unit 51 divides, into a plurality of partial regions, the region of interest obtained from each of the cross sections of the first image (image I1) and second image (image I2) each having the plurality of cross sections. More specifically, the partial region obtaining unit 51 obtains the region of interest from each of the images I1 and I2, and divides the region of interest into a plurality of partial regions at a predetermined ratio. On each cross section including the region of interest, for example, the partial region obtaining unit 51 divides the region of interest into the partial regions based on the position and size of the region of interest on the cross section, as shown in FIGS. 2A to 2D. The partial region obtaining unit 51 divides the region of interest at the predetermined ratio based on the position and size of the obtained region of interest. In this embodiment, as the cross section of the image to be processed, an example of an axial cross section of the three-dimensional CT image is shown. Another cross section (coronal cross section or sagittal cross section) may be used. The axial cross section indicates a cross section vertically passing through an axis (body axis) from head to foot of the object (human body) in a supine position. In the following description, the divided partial regions are represented by P. When N represents the division number, the divided regions in the image I1 are indicated by partial regions I1P1, I1P2, ..., I1PN, and the divided regions in the image I2 are indicated by partial regions I2P1, I2P2, ..., I2PN.

For each of the cross sections of the first image (image I1) and second image (image I2) and each of the partial regions, the statistic information calculation unit 52 calculates statistic information (statistic) about the pixel values of pixels included in the partial region. In this embodiment, the statistic is assumed to be the histogram of feature amounts (for example, pixel values) respectively defined in the pixels included in the partial region. Note that the embodiment is not limited to this and other statistic information (statistic) may be used.

In a pair of cross-sectional positions of the images I1 and I2, the degree-of-coincidence calculation unit 53 associates, with each other, the partial region of the image I1 and that of the image I2, which have been obtained by division by the partial region obtaining unit 51 (for example, I1P1 and I2P1 are associated with each other). In this example, the pair of cross-sectional positions of the two images indicates a pair of cross sections of the first image (image I1) and second image (image I2), which overlap each other when the two images are made to overlap each other on the axial cross sections.

An example of the pair of cross-sectional positions will be described in detail with reference to examples shown in FIGS. 9A to 9C. In FIGS. 9A to 9C, S1 represents the first cross section of a cross section group forming a given image, and I1S1 represents the first cross section of the image I1. The total number of cross sections of the image I1 is A and the total number of cross sections of the image I2 is B. That is, the image I1 has A cross sections S1 to SA, and the image I2 has B cross sections S1 to SB. A pair of cross-sectional positions which overlap (that is, which are at the identical positions) on the cross sections of the images I1 and I2 when the two images are made to overlap each other is (I1S1, I2SB) in FIG. 9A, and the number of pairs of cross sections existing at the identical positions in the respective images is one.

FIGS. 9B and 9C each show an example in which pairs of cross-sectional positions are formed by the cross section groups of the respective images. Referring to FIG. 9B, pairs of cross-sectional positions which overlap each other on the cross sections of the images I1 and I2 are ((I1S1, I2S(B-1)), (I1S2, I2SB)). Referring to FIG. 9B, the first cross section I1S1 of the image I1 and the second cross section I2S(B-1) from the end of the image I2 are at the identical positions, and the second cross section I1S2 of the image I1 and the last cross section I2SB of the image I2 are at the identical positions.

Referring to FIG. 9C, pairs of cross-sectional positions which overlap each other on the cross sections of the images I1 and I2 are ((I1S1, I2S(B-2)), (I1S2, I2S(B-1)), (I1S3, I2SB)). Referring to FIG. 9C, the first cross section I1S1 of the image I1 and the third cross section I2S(B-2) from the end of the image I2 are at the identical positions, and the second cross section I1S2 of the image I1 and the second cross section I2S(B-1) from the end of the image I2 are at the identical positions. Furthermore, the third cross section I1S3 of the image I1 and the last cross section I2SB of the image I2 are at the identical positions. The number of pairs of cross sections of the images I1 and I2, which overlap each other, is two in FIG. 9B, and is three in FIG. 9C. A group of cross sections at the identical positions is set as an evaluation value calculation range.

Next, the degree-of-coincidence calculation unit 53 calculates the degree of coincidence between the pieces of statistic information (statistics) for each pair of associated partial regions using the pieces of statistic information (statistics) calculated by the statistic information calculation unit 52. For example, if I1P1 and I2P1 are associated with each other, the degree-of-coincidence calculation unit 53 calculates the degree of coincidence between the statistic information (statistic) of the partial region I1P1 and the statistic information (statistic) of the partial region I2P1.

After that, the cross-sectional position specifying unit 54 integrates the degrees of coincidence each calculated for each pair of partial regions of each pair of cross sections, thereby calculating an evaluation value for a pair of cross-sectional positions. For example, in the case of FIG. 9A, the cross-sectional position specifying unit 54 integrates the degrees of coincidence each calculated for each pair of partial regions of each pair of cross sections (I1S1, I2SB) in the pair of cross-sectional positions (I1S1, I2SB), thereby calculating an evaluation value for the pair of cross-sectional positions ((I1S1, I2SB) in the case of FIG. 9A).

In the case of FIG. 9B, the cross-sectional position specifying unit 54 integrates the degrees of coincidence each calculated for each pair of partial regions of each pair of cross sections in each pair of cross-sectional positions ((I1S1, I2S(B-1)) or (I1S2, I2SB)), thereby calculating an evaluation value for the pair of cross-sectional position ((I1S1, I2S(B-1)) or (I1S2, I2SB)). At this time, as for the pairs of the cross-sectional positions in FIG. 9B, the number of pairs of cross sections which overlap each other is two. Thus, evaluation values are respectively calculated by integrating the degrees of coincidence calculated for (I1S1, I2S(B-1)) and those calculated for (I1S2, I2SB).

Similarly, in the case of FIG. 9C, the cross-sectional position specifying unit 54 integrates the degrees of coincidence each calculated for each pair of partial regions of each pair of cross sections in each pair of cross-sectional positions ((I1S1, I2S(B-2)), (I1S2, I2S(B-1)), or (I1S3, I2SB)), thereby calculating an evaluation value for the pair of cross-sectional positions ((I1S1, I2S(B-2)), (I1S2, I2S(B-1)), or (I1S3, I2SB)). At this time, as for the pairs of the cross-sectional positions in FIG. 9C, the number of pairs of cross sections which overlap each other is three. Thus, evaluation values are respectively calculated by integrating the degrees of coincidence calculated for (I1S1, I2S(B-2)), those calculated for (I1S2, I2S(B-1)), and those calculated for (I1S3, I2SB).

The cross-sectional position specifying unit 54 calculates evaluation values each representing the degree of coincidence between the two images using the degrees of coincidence calculated by the degree-of-coincidence calculation unit 53, and obtains the positions (corresponding cross-sectional positions) of corresponding cross sections between the plurality of images based on comparison between the evaluation values. The cross-sectional position specifying unit 54 specifies the positions of corresponding cross sections between the images I1 and I2 based on comparison between the evaluation values each obtained by integrating, over all of the plurality of partial regions in the cross sections forming the pair of cross-sectional positions and the plurality of cross sections, the calculated degrees of coincidence between the pairs of partial regions. For example, if the three pairs of cross-sectional positions are given, as shown in FIGS. 9A, 9B, and 9C, the cross-sectional position specifying unit 54 calculates, for each of all the pairs (FIGS. 9A, 9B, and 9C) of cross-sectional positions in the images I1 and I2, an evaluation value representing the degree of coincidence between the two images using the degrees of coincidence calculated by the degree-of-coincidence calculation unit 53. Then, the cross-sectional position specifying unit 54 obtains, as the positions (corresponding cross-sectional positions) of corresponding cross sections between the plurality of images, the pair of cross-sectional positions having the highest one of the calculated evaluation values, and outputs information indicating the obtained corresponding cross-sectional positions.

The display processing unit 55 displays the corresponding cross sections of the images I1 and I2 on the display unit 36 based on the positions (corresponding cross-sectional positions) of cross sections specified by the cross-sectional position specifying unit 54. Furthermore, the display processing unit 55 may display the images I1 and I2 obtained by the image obtaining unit 50 and the images of the regions of interest obtained by the partial region obtaining unit 51 in an image display region 300 of the display unit 36. The display processing unit 55 can perform display control to display, in the image display region 300 of the display unit 36, the corresponding cross sections of the images I1 and I2, the images I1 and I2 obtained by the image obtaining unit 50, and the images of the regions of interest obtained by the partial region obtaining unit 51 in combination.

The respective components of the image processing apparatus 10 function in accordance with computer programs. For example, the control unit 37 (CPU) uses the RAM 33 as a work area to load computer programs stored in the ROM 32 or the storage unit 34, and executes them, thereby implementing the functions of the respective components. Note that some or all of the functions of the components of the image processing apparatus 10 may be implemented using a dedicated circuit. Alternatively, some of the functions of the components of the control unit 37 may be implemented using a cloud computer.

For example, an operation apparatus existing in a location different from that of the image processing apparatus 10 may be communicably connected to the image processing apparatus 10 via the network 21. Then, the functions of the components of the image processing apparatus 10 or the control unit 37 may be implemented by transmitting/receiving data between the image processing apparatus 10 and the operation apparatus.

An example of the processing of the image processing apparatus 10 shown in FIG. 1 will be described with reference to FIGS. 2A to 2D and 3 to 10. FIG. 3 is a flowchart illustrating an example of the processing procedure of the image processing apparatus 10. In this embodiment, a case in which the positions of corresponding cross sections in two three-dimensional images are obtained will be described by exemplifying CT images obtained by capturing an object. This embodiment, however, is also applicable to images obtained by another modality. Furthermore, the present invention is applicable to two images each including a plurality of cross sections, and the two images need not always be three-dimensional images.

(Step S101: Obtaining/Display of Images)

Figure 4:
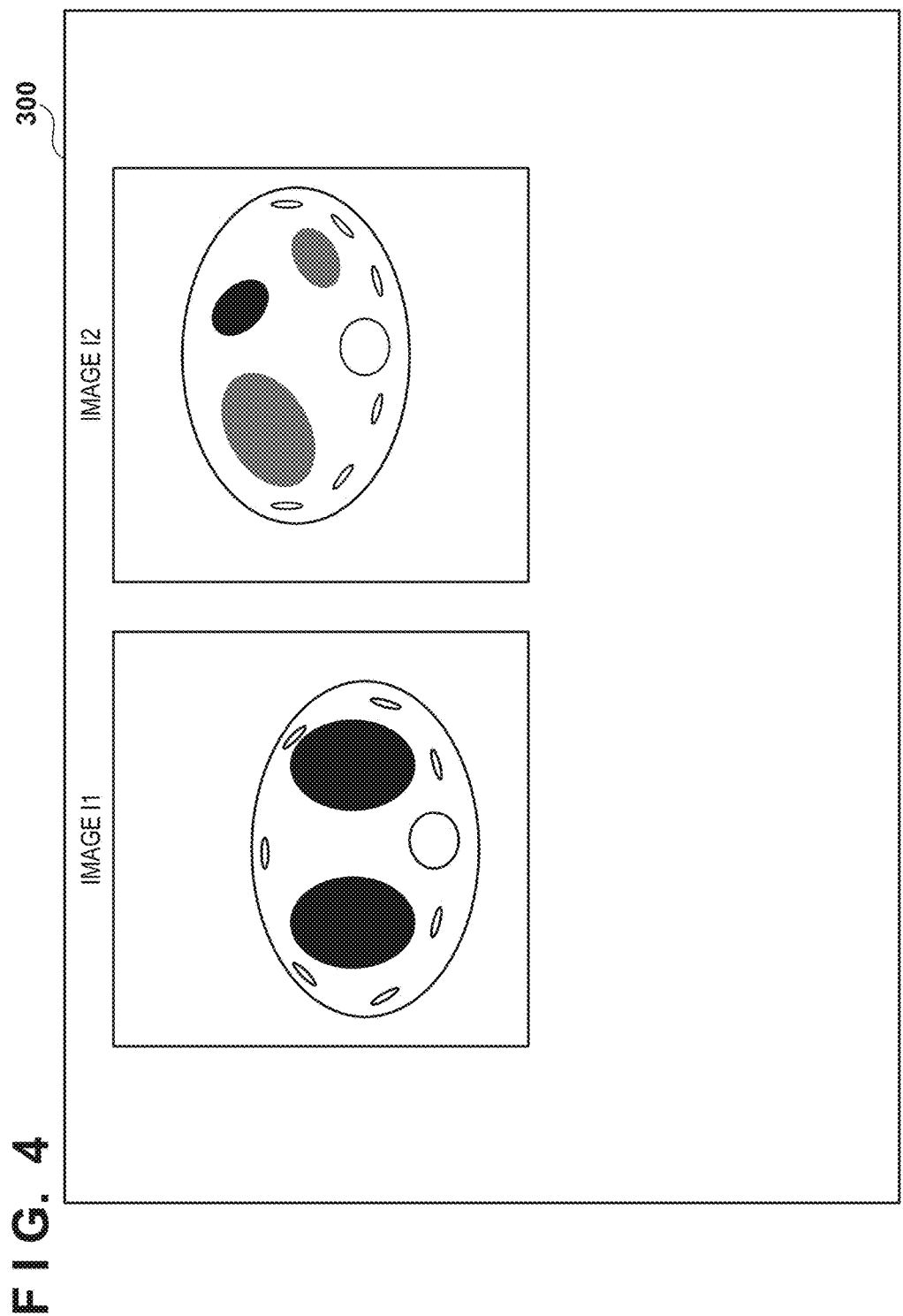
FIG. 4 is a view showing a display example of images obtained by an image obtaining unit.

In step S101, if the user instructs to obtain the first image (image I1) and the second image (image I2) via the operation unit 35, the image obtaining unit 50 obtains, from the database 22, the plurality of images (image data) designated by the user, and stores them in the RAM 33. Furthermore, as shown in FIG. 4, the display processing unit 55 displays, in the image display region 300 of the display unit 36, the plurality of images (image data) obtained from the database 22. Note that the image display on the display unit 36 is processing for providing information to the user, and may be skipped. Step S109 (to be described later) can also be skipped.

(Step S102: Obtaining of Region (Body Region) of Interest)

In step S102, the partial region obtaining unit 51 reads out the plurality of images (image data) from the RAM 33, and obtains a region of interest of the object included in each of the images I1 and I2 using a known region obtaining method. The drawings according to this embodiment show an example in which the body region (the body surface and its internal region) of a subject as an object is obtained as a region of interest. A method such as a segmentation method implemented by combining the threshold processing of pixel values and graphic form shaping processing or a graph cut segmentation method can be used for the processing of obtaining the region of interest. In this embodiment, for example, the region of interest (the body surface and its internal region of the object) shown in FIG. 5B is obtained for the image I1 shown in FIG. 5A. Note that if there is a cross section including no region of interest, the following processing is not executed for this cross section.

(Step S103: Division of Obtained Region of Interest)

In step S103, the partial region obtaining unit 51 divides the region of interest obtained in step S102 into a plurality of partial regions at a predetermined ratio, and stores a processing result in the RAM 33. As shown in FIG. 5C, the partial region obtaining unit 51 divides the obtained region of interest into partial regions based on the position and size of the region of interest. In this example, the partial region obtaining unit 51 divides the obtained region of interest at the predetermined ratio in each axial direction using the minimum and maximum coordinate values (xMin, xMax, yMin, and yMax in FIG. 5C) on the x- and y-axes in the region of interest. The predetermined ratio can be determined so that different organs or body parts which look different are included in the respective divided partial regions. This embodiment will describe an example in which the region of interest is divided into nine partial regions by dividing each axial direction into three parts at a ratio of 3:4:3. The method (division number and division ratio) of dividing the region of interest is not limited to this. For example, a different division number and a different division ratio may be used for each axial direction, or the X-Y coordinate space may be converted into another coordinate space such as a polar coordinate space and then division may be performed in the converted coordinate space. Alternatively, the region of interest may be divided into arbitrary shapes using a predetermined division pattern.

As a result of dividing the region of interest by the partial region obtaining unit 51, a result shown in FIG. 5D is obtained. More specifically, by dividing the region of interest, the bone structure of the object can be roughly divided. For example, if the object undergoes CT imaging in a supine position, the collarbone of the object is often included in the upper partial regions such as I1P1, I1P2, and I1P3 in an axial cross-sectional image including the collarbone. Furthermore, the spine is often included in the partial region I1P8 or I1P5 in a cross section including the spine. The ribs are often included in the partial regions relatively close to the periphery, such as I1P1, I1P3, I1P4, I1P6, I1P7, and I1P9 in a cross section including the ribs. A thighbone is often included in a region such as I1P4, I1P5, or I1P6 existing relatively at the center in the y-axis direction. That is, since a specific partial region in which a pixel including a specific bone exists changes depending on the kind of bone of the object, it is possible to obtain partial regions in which the bone structure of the object is roughly reflected, by dividing the region of interest.

The effect of dividing, as the region of interest, the body region of the subject as the object in step S103 before calculating corresponding cross-sectional positions in two three-dimensional images will be described in detail in step S104 (to be described later).

(Step S104: Calculation of Statistic of Pixel Values Included in Region for Each Partial Region Divided in Each Cross Section)

In step S104, for each of the cross sections of the images I1 and I2 and each of the partial regions, the statistic information calculation unit 52 calculates statistic information (statistic) about the pixel values (density values) of pixels included in the partial region, and stores the calculated statistic information in the RAM 33. In this embodiment, the statistic information (statistic) is assumed to be the histogram of the pixel values (density values) of the pixels included in the partial region. That is, if the region of interest is divided, as shown in FIG. 5D, histograms related to all the partial regions I1P1 to I1P9 are calculated in each axial cross section of the image I1 (three-dimensional image I1) (therefore, histograms the number of which is given by (the number of cross sections x the number (nine) of partial regions) are obtained for the image I1). Similarly, for the image I2 (three-dimensional image I2), histograms related to all the partial regions I2P1 to I2P9 are calculated in each axial cross section (therefore, histograms the number of which is given by (the number of cross sections×the number (nine) of partial regions) are obtained for the image I2).

Note that if the histogram of the pixel values is used, it is desirable to set a bin so as to target a pixel value (150 [H.U.] or more) in the bone region. The reason for this is that the bone region of the object is hardly influenced by a contrast medium or the like, and even if imaging is performed at different timings, the density information is relatively stable. The setting value of the width of a bin may be 1 [H.U.] or 100 [H.U.]. Furthermore, the setting values of the histogram may be set differently for each partial region.

Figure 6A:
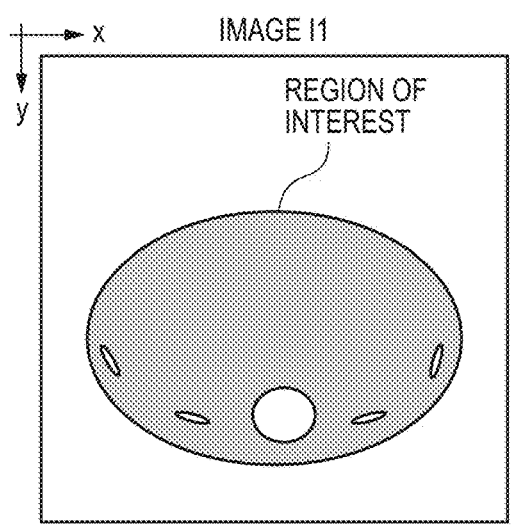
FIGS. 6A to 6C are views respectively showing examples of the regions of interest included in the images.
Figure 6B:
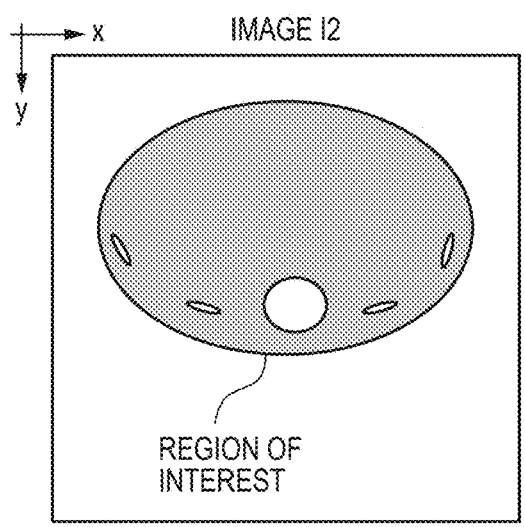
Figure 6C:
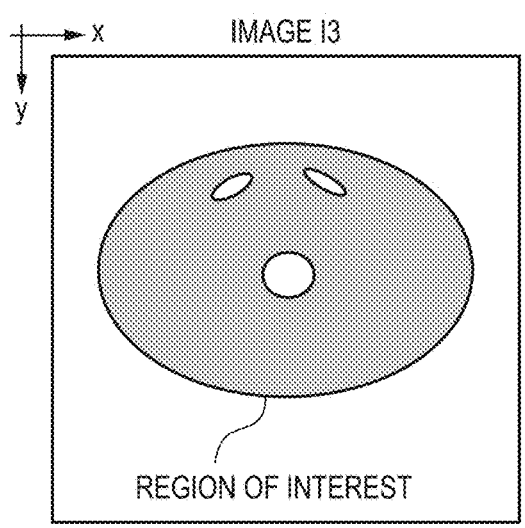

The effect of dividing the region (body region) of interest of the object in step S103 will now be described. In general, the histogram of the pixel values (density values) is a calculation amount independent of the positions (coordinate positions) at which the pixels exist. As a practical example, a case shown in FIGS. 6A, 6B, and 6C will be considered. The differences between three images shown in FIGS. 6A to 6C are as follows. That is, the position of the region of interest with respect to the boundary of the image indicated by a black frame (rectangle) is different between FIGS. 6A and 6B. On the other hand, in FIG. 6C, the number of white regions and their positions in the region of interest are different from those in FIG. 6A or 6B. That is, FIGS. 6A and 6B show the images obtained by capturing the same cross section of the object but FIG. 6C shows the image obtained by capturing a different cross section of the object. If, however, the gross areas of the white regions in the regions of interest are equal to each other, the calculation results of histograms obtained from the respective images or the respective regions of interest in FIGS. 6A, 6B, and 6C coincide with each other.

That is, the use of the features of the histograms has an advantage that it is possible to evaluate that the images are obtained by capturing the same cross section of the object even if, for example, there is a positional shift in the x or y direction with respect to the regions of interest in the images, as shown in FIGS. 6A and 6B. On the other hand, FIGS. 6A and 6C show the different cross sections of the object. If simple histograms are used, it is unwantedly evaluated that FIGS. 6A, 6B, and 6C show the same cross section.

More specifically, a region "from the lower portion of the pelvis to the upper portion of the thighbone" and a region of the "neck" in a three-dimensional CT image will be exemplified. It is known that the histograms of the pixel values in these regions are close to each other. If the degree of coincidence is calculated using the histograms calculated for the entire body region, cross sections in different ranges may erroneously be recognized as corresponding cross sections.

A method of dividing the region (body region) of interest of each of the images shown in FIGS. 6A to 6C, as executed in step S103, obtaining results shown in FIGS. 7A to 7C, and then calculating a histogram in each partial region will be described next.

Figure 7A:
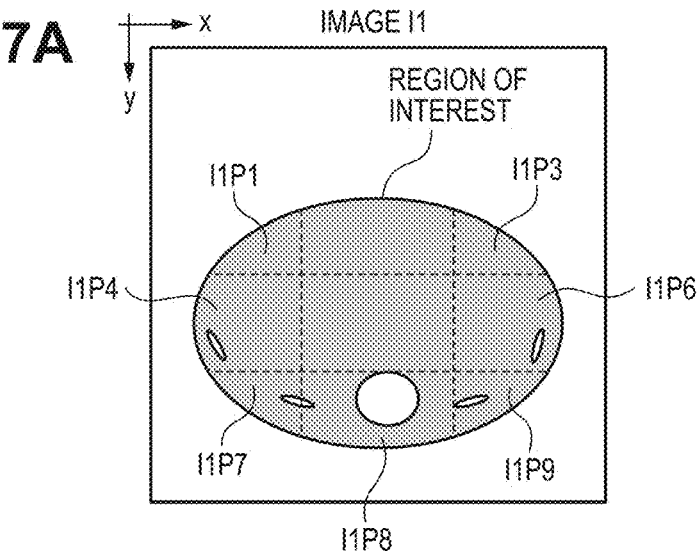
FIGS. 7A to 7C are views respectively showing examples of division of the regions of interest included in the images shown in FIGS. 6A to 6C at the predetermined ratio.
Figure 7B:
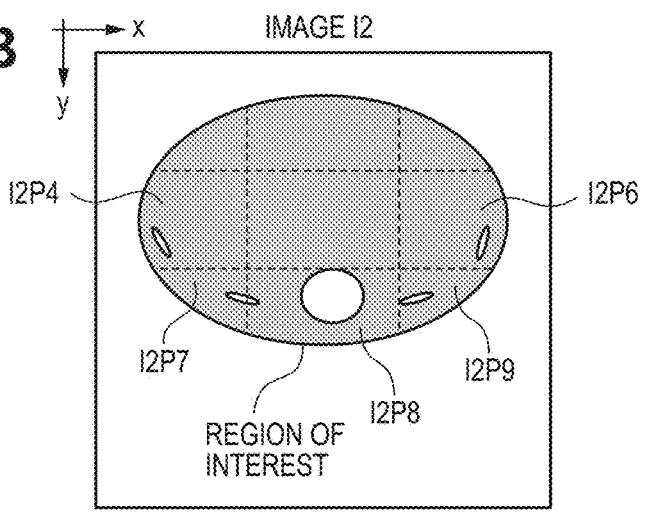

FIGS. 7A and 7B will be explained first. In this example, the image I1 in FIG. 7A and the image I2 in FIG. 7B will be collectively referred to as an image In (n=1 or 2) hereinafter. The white regions included in the region of interest exist in the five partial regions InP4, InP6, InP7, InP8, and InP9 in the image In. In this embodiment, the areas of the white regions included in each of the five pairs of partial regions are equal to each other, and thus histograms calculated for the pair of partial regions coincide with each other. Therefore, even if the degrees of coincidence are evaluated by comparing, between corresponding partial regions, the histograms calculated from the plurality of partial regions, and the evaluation results are integrated, it can be evaluated that FIGS. 7A and 7B show the same cross section.

Figure 7C:
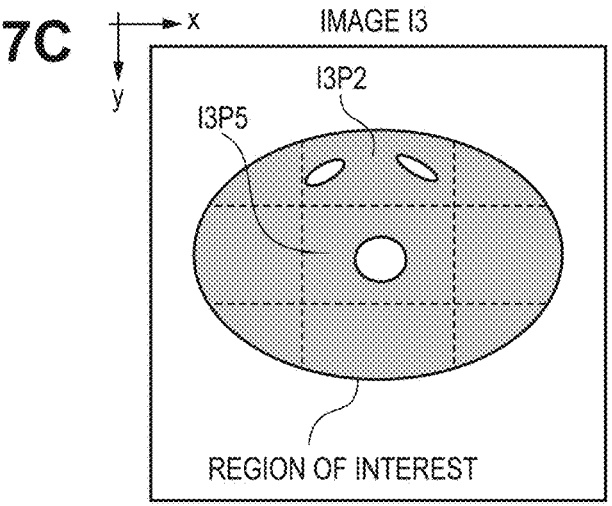

On the other hand, in FIG. 7C, the white regions included in the region of interest exist in the two partial regions I3P2 and I3P5. Thus, if the degree of coincidence is evaluated by calculating the histograms for each pair of corresponding partial regions in FIGS. 7A and 7C, the partial regions I1P1 and I3P1 coincide with each other and the partial regions I1P3 and I3P3 coincide with each other but the remaining partial regions do not coincide with each other. Therefore, if evaluation is performed by integrating the degrees of coincidence of all the pairs of partial regions, the degree of coincidence is low. That is, if the histogram is calculated for each partial region obtained by dividing the region of interest, and then the degree of coincidence is calculated, as described above, the cross section of FIG. 7C can evaluated to be different from those of FIGS. 7A and 7B.

In the examples of the region "from the lower portion of the pelvis to the upper portion of the thighbone" and the region of the "neck" in the three-dimensional CT image, the positions of the pelvis and thighbone of the object are different from the positions of the collarbone and spine included in the range of the neck. Therefore, it is possible to reduce the risk of erroneous recognition in calculation of corresponding cross-sectional positions between two images by dividing the region (body region) of interest in each of the two images to be compared, calculating a histogram in each partial region, and integrating results of evaluating the degrees of coincidence between corresponding partial regions.

As described above, division of the region (body region) of interest has an effect of imposing a restriction on the position of a pixel having a given pixel value when calculating the degree of coincidence between the statistics of the pixel values. That is, if different anatomical structures of the object with a cross section in which respective partial regions obtained by dividing the region (body region) of interest are included can roughly be discriminated in terms of positions, even if statistics such as histograms independent of the positions are used, it is possible to suppress erroneous recognition that different cross sections correspond to each other.

This embodiment has explained an example that a histogram as statistic information (statistic) of pixel values included in each partial region is used as a statistic related to the partial region. However, another kind of statistic information (statistic) may be used. The present invention is applicable regardless of the kind of statistic information (statistic).

(Steps S105 to S108: Search for Corresponding Cross-Sectional Positions in Images I1 and I2)

(Step S105: Decision of Pair of Cross-Sectional Positions from Images I1 and I2)

Figure 8B:
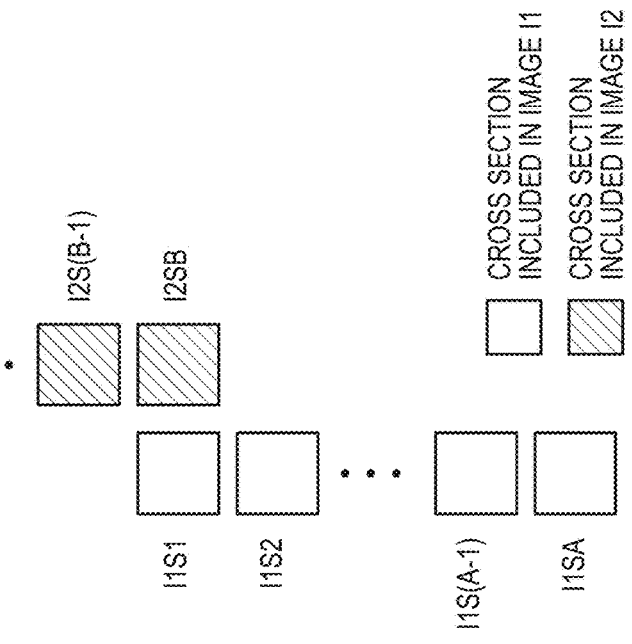
FIGS. 8A and 8B are views showing an example of a pair of positions of cross sections when two three-dimensional images each formed by a plurality of cross sections are given.
Figure 8A:
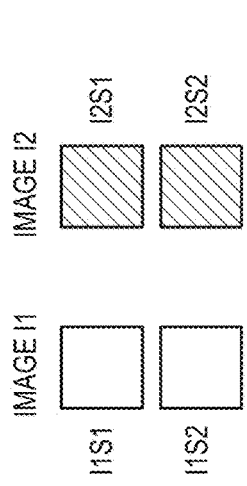

In step S105, the cross-sectional position specifying unit 54 decides a pair of cross-sectional positions in the images I1 and I2. A method of deciding an initial pair of cross-sectional positions will be described with reference to FIGS. 8A and 8B. In FIG. 8A as well, S1 represents the first cross section of a cross section group forming a given image, and I1S1 represents the first cross section of the image I1. Furthermore, the total number of cross sections of the image I1 is A and the total number of cross sections of the image I2 is B. In this embodiment, as a pair of cross-sectional positions, a pair shown in FIG. 8B is decided as an initial pair. That is, the initial pair of cross-sectional positions includes the first cross section I1S1 of the image I1 and the last cross section I2SB of the image I2.

When deciding a pair of cross sections in the images I1 and I2, a condition that, for example, a predetermined number or more of cross sections overlap each other may be set. Although the first cross section of the image I1 and the last cross section of the image I2 are set as an initial pair, different cross sections in the respective images may be used as an initial pair.

(Step S106: Calculation of Evaluation Value for Decided Pair of Cross-Sectional Positions)

In step S106, the cross-sectional position specifying unit 54 calculates an evaluation value representing the degree of coincidence between the images I1 and I2 for the pair of cross-sectional positions decided in step S105, and stores it in the RAM 33. That is, the cross-sectional position specifying unit 54 integrates the degrees of coincidence calculated for the respective partial regions of the cross sections (for example, I1S1 and I2SB in FIG. 8B) in the pair of cross-sectional positions, thereby calculating an evaluation value for the pair (I1S1, I2SB) of cross-sectional positions. More specifically, as shown in FIGS. 9A, 9B, and 9C, in accordance with the result of deciding the pair of cross-sectional positions, the cross-sectional position specifying unit 54 decides an evaluation value calculation range based on overlap of the cross sections of the two images. The example of FIG. 8B shows a case in which the first cross section I1S1 of the image I1 and the last cross section I2SB of the image I2 are given as a pair of cross-sectional positions. As for this pair, as shown in FIG. 9A, the total number of pairs of corresponding cross sections in the images I1 and I2 (cross sections overlapping each other in the two images) is one. Thus, only this pair is an evaluation value calculation target.

In the example shown in FIG. 9B, I1S1 and the second cross section I2S(B-1) from the end of the image I2 form a pair of cross-sectional positions, and I1S2 and the last cross section I2SB of the image I2 form a pair of cross-sectional positions. As for these pairs, the total number of pairs of corresponding cross sections (at the identical positions in the body axis direction) in the images I1 and I2 is two, and the two pairs are calculation targets. Similarly, in the example shown in FIG. 9C, three pairs are calculation targets. That is, the number of pairs of cross sections for each of which an evaluation value representing the degree of coincidence between the images I1 and I2 is calculated is decided based on the range of cross sections overlapping each other in the images I1 and I2.

The cross-sectional position specifying unit 54 inputs the pairs of cross-sectional positions as calculation targets to the degree-of-coincidence calculation unit 53, and obtains evaluation values each representing the degree of coincidence between the images I1 and I2.

Figure 2C:
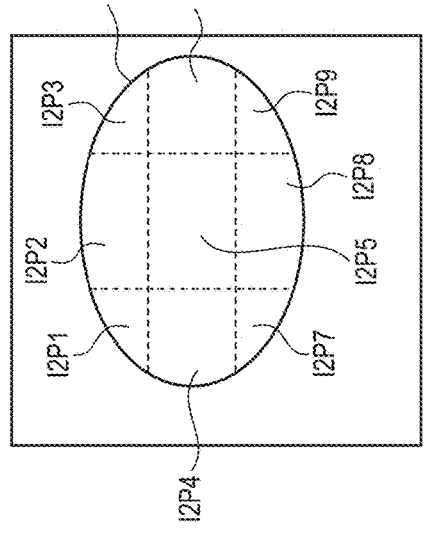
Figure 2D:
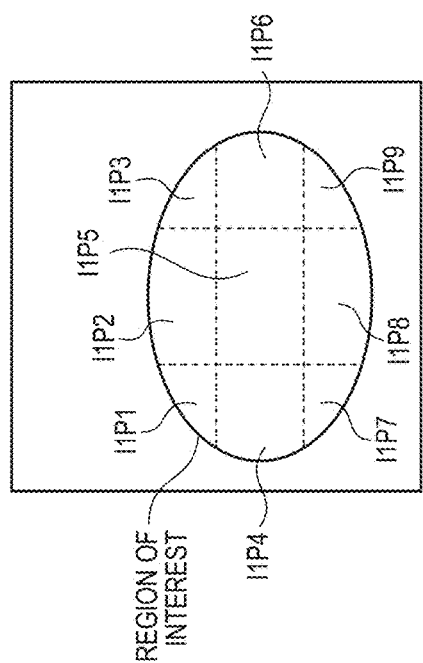

If the pairs of cross-sectional positions as calculation targets for calculation of the degree of coincidence between the two images are input, the degree-of-coincidence calculation unit 53 associates, with each other, the partial region of the image I1 and that of the image I2, which have been divided in step S103, for each pair of cross-sectional positions at the identical positions in the body axis direction in the images I1 and I2. In the example of FIG. 9B, the pairs of corresponding cross-sectional positions in the images I1 and I2 are "I1S1, I2S(B-1)" and "I1S2, I2SB". In this embodiment, the pairs of cross-sectional positions are set as processing targets, and the degree-of-coincidence calculation unit 53 associates, with each other, the partial regions I1Pm and the partial regions I2Pm (m=1 to 9), which have been obtained by dividing the regions of interest, in the image I1 shown in FIG. 2A and the image I2 shown in FIG. 2B (FIGS. 2C and 2D). By associating the partial regions in this way, it is possible to evaluate the degree of coincidence between statistics of the partial regions in the roughly identical locations (positions) in the regions of interest.

Based on the histograms calculated for the respective partial regions in step S104, the degree-of-coincidence calculation unit 53 calculates the degree of coincidence for each pair of cross-sectional positions at the identical positions in the images I1 and I2 and each pair of corresponding partial regions. At this time, the degree-of-coincidence calculation unit 53 calculates the degrees of coincidence, the number of which is given by (the number of pairs of cross sections made to overlap each other in the two images) x (the number of pairs of partial regions). The degree of coincidence includes the Euclidean distance between the histogram calculated from the partial region in the image I1 and that calculated from the partial region in the image I2. After that, the cross-sectional position specifying unit 54 integrates the degrees of coincidence between all the histograms calculated by the degree-of-coincidence calculation unit 53, and obtains an evaluation value for a pair of cross-sectional positions in the images I1 and I2. As a method of calculating an evaluation value by integrating the degrees of coincidence between all the histograms, for example, a method of obtaining the average value of the degrees of coincidence between all the histograms and setting it as an evaluation value can be used.

(Step S107: Determination of Whether Evaluation Values Have Been Calculated for All Pairs)

In step S107, the cross-sectional position specifying unit 54 determines whether evaluation is complete for all the pairs of cross-sectional positions in the images I1 and I2. If it is determined in step S107 that obtaining of evaluation values for all the pairs of cross-sectional positions is complete (YES in step S107), the processing of deciding the pair of cross-sectional positions ends, and the process advances to step S108.

On the other hand, if it is determined in step S107 that obtaining of evaluation values for all the pairs of cross-sectional positions is not complete (NO in step S107), the process returns to step S105. If the cross-sectional position specifying unit 54 determines whether evaluation is complete for all the pairs of cross-sectional positions in the images I1 and I2, and determines that evaluation is not complete, it calculates an evaluation value for a pair of cross-sectional positions which has not been evaluated yet. That is, if the process returns to step S105, the cross-sectional position specifying unit 54 calculates an evaluation value for a pair of cross-sectional positions, which has not been evaluated yet, among the pairs of cross-sectional positions in the images I1 and I2. The cross-sectional position specifying unit 54 obtains, as a pair of cross-sectional positions which has not been evaluated, a pair of cross-sectional positions by relatively shifting the position of the cross section of the image I2 by one cross section with respect to the cross section of the image I1, and specifies the positions of corresponding cross sections between the images I1 and I2 based on comparison between the evaluation values calculated for the obtained pairs of cross-sectional positions. If, for example, the pair of the cross-sectional positions shown in FIG. 9A is evaluated first, the pair of cross-sectional positions is evaluated while shifting, by one cross section, the cross section set at the same position in the body axis direction in the image I2 as that in the image I1, as shown in FIGS. 9B and 9C. All the pairs can be evaluated by calculating the evaluation value for each pair of cross-sectional positions, and finally evaluating the pair of I1SA and I2S1.

Since the evaluation value (the Euclidean distance between the histograms) is calculated based on a statistic defined for each partial region of each cross section of each image, the process in step S104 is never repeated. That is, even if the pair of cross-sectional positions in the images I1 and I2 is changed, it is not necessary to newly calculate statistics from the respective images, thereby enabling high-speed processing.

(Step S108: Decision of Pair of Cross-Sectional Positions Having Best Evaluation Value as Corresponding Cross Sections)

In step S108, the cross-sectional position specifying unit 54 decides the pair of cross-sectional positions having the highest evaluation value as corresponding cross-sectional positions between the images I1 and I2 based on the evaluation values for all the pairs of cross-sectional positions in the images I1 and I2. In this embodiment, since the evaluation value is based on the Euclidean distance between the histograms, the pair of cross-sectional positions having the smallest evaluation value is best.

(Step S109: Display of Corresponding Cross Sections in Images I1 and I2)

Figure 10:
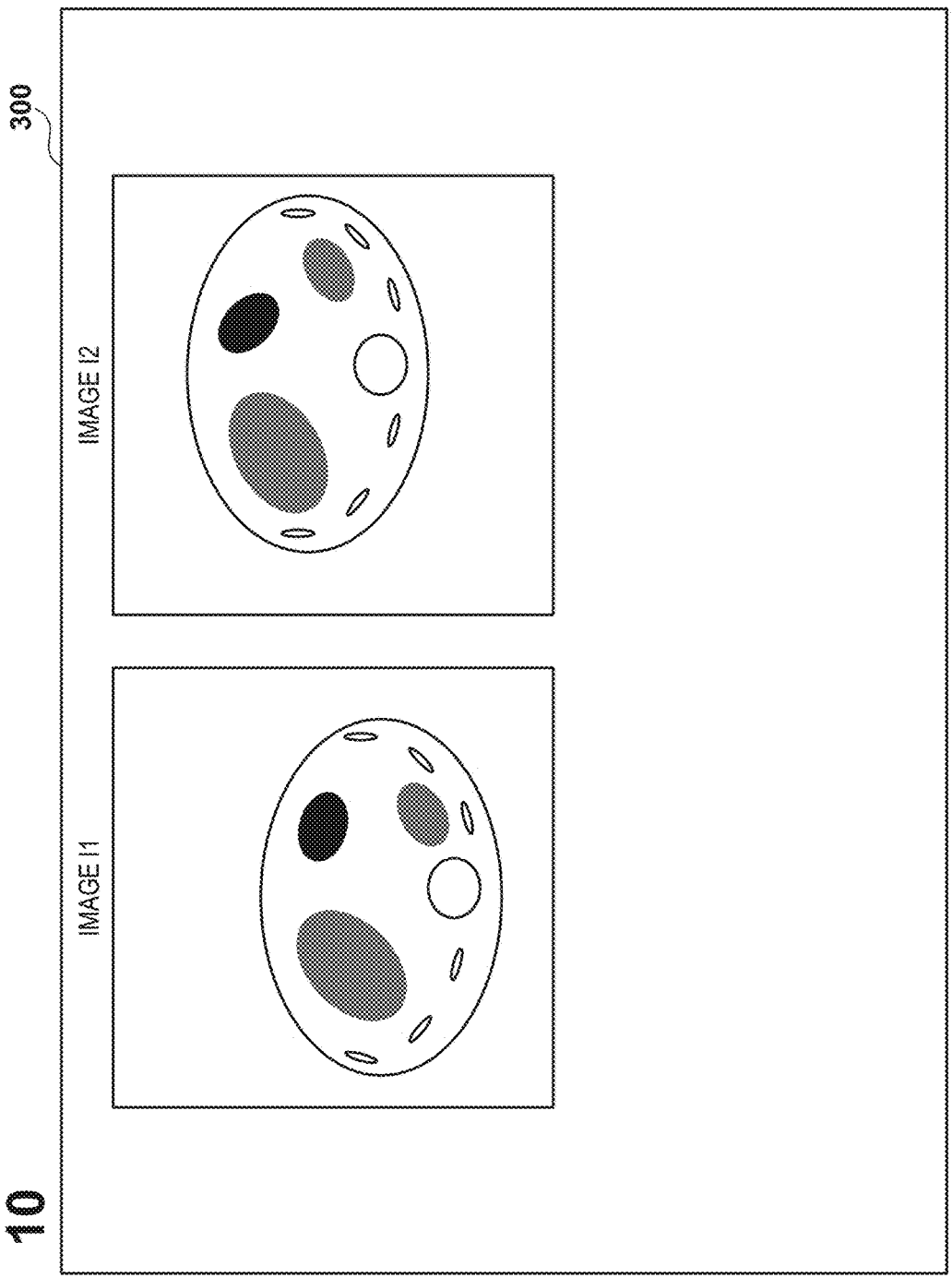
FIG. 10 is a view showing a display example of cross-sectional images at the positions of corresponding cross sections between the images.

In step S109, the cross-sectional position specifying unit 54 outputs the specified corresponding cross-sectional positions to the display processing unit 55. As shown in FIG. 10, the display processing unit 55 displays, in the image display region 300 of the display unit 36, the corresponding cross sections in the images I1 and I2.

This embodiment has the following feature. That is, in a process of obtaining the positions (corresponding cross-sectional positions) of corresponding cross sections between two three-dimensional images, a region of interest is obtained from each of the images I1 and I2, and divided into a plurality of partial regions at a predetermined ratio. After that, the partial regions of the two images are associated with each other, and the Euclidean distance between the histograms of the pixel values of pixels included in the respective partial regions is calculated. A result of obtaining the average for all the cross sections and all the partial regions is used as an evaluation value, thereby specifying corresponding cross-sectional positions. According to this embodiment, the positions of corresponding cross sections between the images I1 and I2 can be specified stably more than the conventional technique.

This embodiment has been described above. The present invention, however, is not limited to this, and changes and modifications can be made within the scope of claims.

According to this embodiment, it is possible to stably specify the positions of corresponding cross sections between two three-dimensional images. That is, it is possible to more stably obtain the positions of corresponding cross sections between the first and second images by calculating the degrees of coincidence between pieces of statistic information (statistics) of the corresponding partial regions of the corresponding cross sections of the first and second images, and integrating them over all of the images.

(Modification 1: Statistic Information Based on Information except for Pixel Values)

In step S104, for each of the partial regions of the images I1 and I2, the statistic information calculation unit 52 uses the histogram of pixel values included in the partial region to calculate statistic information (statistic) about the pixel values (density values) of pixels included in the partial region. However, the area of the partial region may be used as a statistic, or the representative value (maximum value, third quartile, median value, first quartile, minimum value, or the like) of the pixel values of the pixels included in the partial region or a combination of these values may be used. That is, the statistic information of the partial region calculated by the statistic information calculation unit 52 includes the histogram calculated based on the pixel values of the pixels included in the partial region. Alternatively, the statistic information of the partial region calculated by the statistic information calculation unit 52 includes a histogram calculated based on the area of the partial region or the representative value of the pixel values of the pixels included in the partial region.

Even if the area of the partial region or the representative value of the pixel values is used as statistic information (statistic), if the pieces of statistic information (statistics) calculated for the respective cross sections and the respective partial regions are the same, a Euclidean distance can be used for calculation (evaluation of the degree of coincidence) by the degree-of-coincidence calculation unit 53 in step S106.

(Modification 2: When Original Image or Another Image Applied with Image Processing Filter is Used)

The two images obtained by the image obtaining unit 50 may be images other than images (original images) obtained by various modalities. Each of the cross sections of the image I1 and the cross sections of the image I2 is a cross section of a cross-sectional image created using a plurality of cross-sectional images or a cross section of a cross-sectional image created by performing image processing for a plurality of cross-sectional images. For example, an image newly created by obtaining the representative pixel value (the maximum value, minimum value, median value, or the average of the pixel values in the plurality of cross-sectional images) at each pixel position from the plurality of adjacent cross-sectional images in the original image may be used. Alternatively, an output image of each of various image processing filters such as an edge enhancement filter, a region image obtained by extracting a region of interest, or an image created by combining these processes may be used.

To speed up the overall processing, an image obtained by reducing one of the above-described images may be used.

(Modification 3: Division Based on Distance Function and Method of Using Combination of Plural Division Results)

In the embodiment, in step S103, based on the minimum and maximum coordinate values on the x- and y-axes in the region of interest extracted from each image, the partial region obtaining unit 51 divides the region of interest in each axial direction at the predetermined ratio. However, another division method may be adopted.

For example, a region (the body surface of an object and its internal region) of interest shown in FIG. 11B is obtained for an image I1 shown in FIG. 11A. As shown in FIG. 11C, the region of interest may be divided into partial regions in accordance with the distance from a given pixel (pixel of interest) included in the image or the region of interest. That is, the partial region obtaining unit 51 can divide the region of interest into a plurality of partial regions in accordance with the distance from the pixel of interest included in the region of interest. A result shown in FIG. 11D is obtained as a result of dividing the region of interest by the partial region obtaining unit 51. More specifically, by dividing the region of interest, the bone structure of the object can be roughly divided.

In the example of FIG. 11D, the collarbone of the object is often included in a partial region P3, and the spine is often included in P1. The ribs can exist in any of P1, P2, and P3 but most of the thighbone is considered to be often included in P2. That is, the collarbone, spine, and thighbone of the object can be roughly discriminated by dividing the region, and it is thus possible to obtain the similar effect as in the embodiment. Note that this modification has explained an example in which the region of interest is divided into three partial regions. However, thresholds for determining the distances for P1, P2, and P3 may be adaptively changed, and the division number of partial regions is not limited to this.

As described above, the method of dividing the region of interest to obtain partial regions may be any method as long as it is possible to divide the region of interest so that respective divided partial regions include different organs of the object or the like, and appropriately associate the partial regions between the two images.

Note that the partial region obtaining unit 51 may use the plurality of methods of dividing the region of interest in combination in the processes in step S104 and subsequent steps by, for example, changing the reference symbols (I1P1, I1P2, and I1P3) of the partial regions shown in FIG. 11D to I1P10, I1P11, and I1P12, and using them with the partial regions shown in FIG. 5D.

(Modification 4: Weighting for Each Cross Section/Each Partial Region at Time of Integration of Evaluation Values)

In the embodiment, in step S106, when integrating the evaluation results of the histogram groups each of which has been calculated for each pair of partial regions by the degree-of-coincidence calculation unit 53, the cross-sectional position specifying unit 54 calculates an evaluation value for each pair of cross-sectional positions using the average of all the Euclidean distances calculated by the degree-of-coincidence calculation unit 53. However, as a method of calculating an evaluation value by integrating the degrees of coincidence between all the histograms, other methods may be used. For example, instead of the average value of the degrees of coincidence between all the histograms, the median value of the degrees of coincidence between all the histograms may be used. In this case, the robustness against a local mismatch is improved. Furthermore, a measure other than the Euclidean distance may be used as the degree of coincidence between the histograms. For example, another evaluation index such as the correlation amount or intersection (overlap amount) between the histograms may be used. In addition, a predetermined weight may be set for the Euclidean distance between the histograms for each partial region and/or each cross section. For example, if a weight is set for each partial region, the cross-sectional position specifying unit 54 can calculate an evaluation value by setting a weight for each of the partial regions of the image I1 and the partial regions of the image I2 based on the imaging conditions of the images I1 and I2. If a weight is set for cross sections forming a pair of cross-sectional positions, the cross-sectional position specifying unit 54 can calculate an evaluation value by setting a weight for the cross sections forming the pair of cross-sectional positions based on the imaging conditions of the images I1 and I2. Although the cross-sectional position specifying unit 54 integrates the degrees of coincidence for all the partial regions, which have been calculated by the degree-of-coincidence calculation unit 53, other methods may be adopted as a method of integrating the degrees of coincidence. For example, a method of calculating, for each pair of cross sections, the degree of coincidence by integrating the degrees of coincidence between the partial regions in the pair of cross sections, and further integrating the calculation results for the plurality of pairs of cross sections may be used. To integrate the degrees of coincidence in the pair of cross sections, for example, a method using the average, median value, or the average of the values up to the third quartile of the degrees of coincidence between the partial regions in the pair of cross sections is used. Note that the same applies to a method of integrating the calculation results of the degrees of coincidence for the plurality of pairs of cross sections.

As a more practical example, consider a case in which the contrast imaging condition of the object is different between two three-dimensional CT images. It is generally known that pixel values in a location where a blood flow exists become high in imaging of a CT image using a contrast medium. Especially, the pixel values of an organ such as the heart, blood vessel, liver, or kidney largely change. Therefore, when obtaining corresponding cross-sectional positions between a contrast CT image and a non-contrast CT image, it is desirable to calculate the degree of coincidence between the images so as to suppress the influence of the density difference.

Figure 12A:
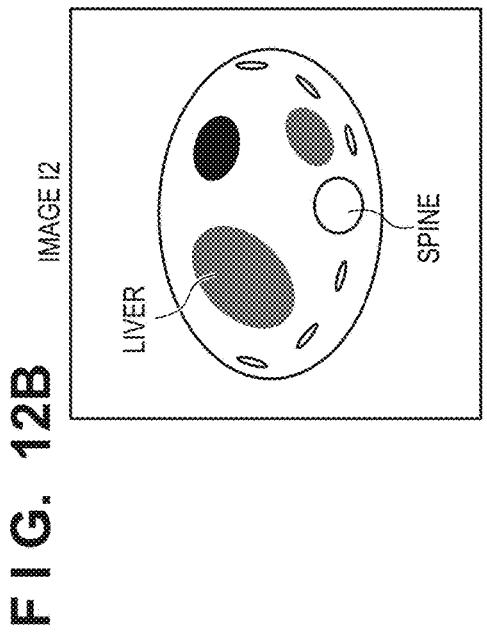
FIGS. 12A to 12D are views indicating a partial region in which a given anatomical structure of an object tends to be included when the region of interest is divided at the predetermined ratio.
Figure 12B:
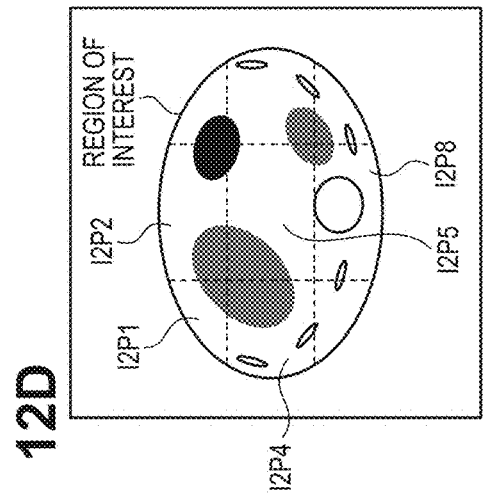
Figure 12C:
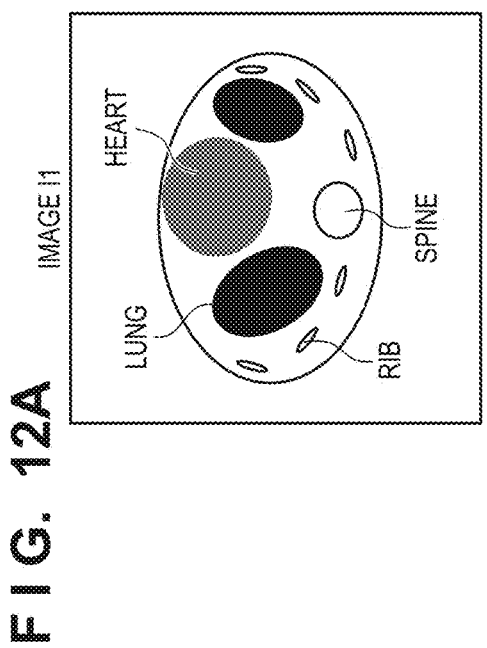
Figure 12D:
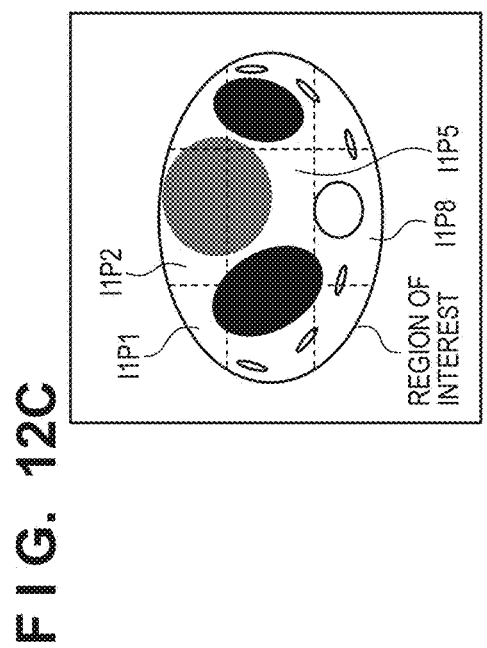

For example, the degree-of-coincidence calculation unit 53 associates, with each other, partial regions obtained by dividing regions of interest in an image I1 shown in FIG. 12A and an image I2 shown in FIG. 12B (FIGS. 12C and 12D). Considering a location where the heart and liver can exist in a supine position, the heart exists in I1P2 and I1P5 at a high ratio, as shown in FIG. 12C. In addition, as shown in FIG. 12D, the liver exists in I2P1, I2P2, I2P4, and I2P5 at a high ratio. As for these partial regions, if the contrast imaging conditions of the input two images are different, the degrees of contrast are different even for the same organ (that is, pixel values are different), and thus the degree of coincidence between histograms of the pixel values is low even for the images at the originally corresponding cross-sectional positions. Therefore, in the above-described case, a weight (reliability) for the evaluation value of the degree of coincidence between the partial regions including the organ having undergone contrast imaging is set small.

On the other hand, in many cases, the spine and ribs exist in the partial regions I1P8 and I2P8 shown in FIGS. 12C and 12D. However, it is known that the influence of the contrast medium on these anatomical structures (bones) is relatively small (the pixel values are difficult to change). Thus, as for the degree of coincidence between these regions, even if the contrast imaging conditions of the two images are different, the degree of coincidence between the images at the corresponding cross-sectional positions remains high, and is considered to be stable. Consequently, a weight for the evaluation value of the degree of coincidence between the partial regions is set large.

As described above, in step S106, when evaluating the degrees of coincidence of the histogram groups each of which has been calculated for each pair of partial regions by the degree-of-coincidence calculation unit 53, and integrating the evaluation results, the cross-sectional position specifying unit 54 can improve the calculation accuracy of corresponding cross-sectional positions by giving a weight to an evaluation value for each pair of partial regions. More specifically, the cross-sectional position specifying unit 54 can obtain corresponding cross-sectional positions more stably by setting a relatively large weight for partial regions, which may be hardly influenced by the contrast imaging conditions, and calculating the weighted average of the degrees of coincidence. For example, in the case shown in FIG. 5D, a weight for I1P7, I1P8, and I1P9 is set twice or more a weight for the remaining partial regions.

Note that when the user instructs, via the operation unit 35, to obtain the first image (image I1) and the second image (image I2), if the contrast imaging conditions of the respective images are also instructed, the cross-sectional position specifying unit 54 can adaptively execute the processing according to Modification 4. Alternatively, the cross-sectional position specifying unit 54 can read out, as the contrast imaging conditions of the respective images, predetermined information stored in advance in the ROM 32 or the RAM 33, and apply it to weighted setting processing. The cross-sectional position specifying unit 54 may automatically perform estimation in each image based on the distribution of the pixel values in the image I1 or I2.

(Modification 5: Coping with Case in Which Body Axis Directions Do Not Coincide)

In the embodiment, the body axis directions of the images I1 and I2 are set to the same direction from head to foot or from foot to head of the human body. That is, assume that the two images are obtained by capturing the human body in the same direction. By changing step S107 as follows, it is possible to cope with a case in which the body axis directions of the images I1 and I2 are different.

In step S107, as shown in FIGS. 9A to 9C, a pair of positions of cross sections is evaluated while shifting, by one cross section, cross sections set at the identical positions in the images I1 and I2. In the embodiment, evaluation is finally performed for the pair of I1SA and I2S1, thereby completing the processing.

To cope with a case in which the body axis directions of the two images are different, in addition to the above step, the same step is performed by reversing the order of the cross sections so that an uppermost one of the cross sections forming the image I2 is set to a lowermost cross section. That is, the cross-sectional position specifying unit 54 determines the body axis directions of the images I1 and I2. If the body axis directions are different, the cross-sectional position specifying unit 54 changes the body axis direction of the image I1 or I2. That is, the cross-sectional position specifying unit 54 reverses one of the body axis directions of the images I1 and I2 so that the body axis directions coincide with each other. Even if the body axis directions of the images I1 and I2 are different, the cross-sectional position specifying unit 54 can perform evaluation in the state in which the body axis directions of the two images coincide with other, by evaluating the degree of coincidence even if the body axis direction is reversed. Note that the cross-sectional position specifying unit 54 can perform processing of reversing the body axis direction based on an input via the operation unit 35 from the user.

In step S108, the cross-sectional position specifying unit 54 can cope with a case in which the body axis directions of the images are different, by obtaining a pair of cross-sectional positions having the highest evaluation value based on the evaluation values for all the pairs of cross-sectional positions and the relationship between the body axis directions of the two images at this time.

(Modification 6: Setting of Weight According to Number of Overlapping Cross Sections)

In the embodiment, in step S106, when calculating an evaluation value for a pair of cross-sectional positions in the images I1 and I2, the evaluation value is calculated regardless of the number of overlapping cross sections set between the two images.

However, if the number of overlapping cross sections is small, the number of partial regions set as evaluation value calculation targets is small. Thus, the evaluation value for an erroneous pair of cross-sectional positions becomes high at a high possibility, as compared with a case in which the number of cross sections is large. To cope with this, to reduce this possibility, the cross-sectional position specifying unit 54 may multiply the evaluation value calculated in step S106 by a weight according to the number of overlapping cross sections. That is, the cross-sectional position specifying unit 54 can calculate an evaluation value by setting a weight according to the number of cross sections forming the pair of cross-sectional positions.

More specifically, by using, as a weight, a numerical value obtained by subtracting, from a constant of 1 or more, a value (a value of 1 or less) obtained by dividing the number of overlapping cross sections set between the two images (the number of ross sections forming the pair of cross-sectional positions) by the maximum value (that is, a smaller one of the numbers of cross sections of the two images), the weight is smaller as overlap of the cross sections is larger. That is, since the Euclidean distance used as an evaluation value for the pair of cross sections according to the embodiment becomes small, an evaluation value with which the degree of coincidence is higher as the number of overlapping cross sections is larger is obtained. Note that the method of calculating a weight for the degree of coincidence is not limited to the above-described method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-080479, filed Apr. 13, 2016, which is hereby incorporated by reference herein in its entirety.

What is claimed is:

1. An image processing apparatus comprising:
a division unit configured to divide, into a plurality of partial regions, a region of interest obtained from each of cross sections of a first image and a second image, each of which has a plurality of cross sections;
a statistic information calculation unit configured to calculate, for each of the cross sections of the first image and the second image and each of the partial regions, statistic information of pixels included in the partial region;
a degree-of-coincidence calculation unit configured to calculate a degree of coincidence between the pieces of statistic information for a partial region in the first image and a partial region, corresponding to the partial region, in the second image, in a pair of cross-sectional positions in the first image and the second image; and
a specifying unit configured to specify positions of corresponding cross sections between the first image and the second image based on comparison between evaluation values each obtained by integrating the degrees of coincidence over the plurality of partial regions.

2. The apparatus according to claim 1, further comprising:
an obtaining unit configured to obtain the first image and the second image,
wherein the division unit obtains a region of interest from each of the first image and the second image, and divide the region of interest into the plurality of partial regions at a predetermined ratio.

3. The apparatus according to claim 1, wherein the division unit divides the region of interest into partial regions based on a position and a size of the region of interest on the cross section.

4. The apparatus according to claim 1, wherein in a pair of cross-sectional positions in the first image and the second image, the degree-of-coincidence calculation unit associates, with each other, the partial region of the first image and the partial region of the second image, which have been divided by the division unit.

5. The apparatus according to claim 4, wherein the degree-of-coincidence calculation unit calculates the degree of coincidence between the pieces of statistic information for each pair of partial regions associated with each other, using the pieces of statistic information calculated by the statistic information calculation unit.

6. The apparatus according to claim 1, wherein the specifying unit determines whether evaluation is complete for pairs of cross-sectional positions in the first image and the second image, and calculates, if the evaluation is not complete, the evaluation value for a pair of cross-sectional positions which has not been evaluated.

7. The apparatus according to claim 6, wherein the specifying unit
obtains, as a pair of cross-sectional positions which has not been evaluated, a pair of cross-sectional positions by relatively shifting, by one cross section, a position of the cross section of the second image with respect to the cross section of the first image, and
specifies positions of corresponding cross sections between the first image and the second image based on comparison between the evaluation values calculated for the obtained pairs of cross-sectional positions.

8. The apparatus according to claim 6, wherein the specifying unit specifies positions of corresponding cross sections between the first image and the second image based on comparison between evaluation values each obtained by integrating, over the plurality of partial regions in the cross sections forming the pair of cross-sectional positions, degrees of coincidence between the partial regions calculated by the degree-of-coincidence calculation unit.

9. The apparatus according to claim 1, wherein if there are a plurality of pairs of cross-sectional positions, the specifying unit obtains evaluation values corresponding to the pairs of cross-sectional positions, and specifies positions of corresponding cross sections between the first image and the second image based on comparison between the evaluation values corresponding to the plurality of pairs of cross-sectional positions.

10. The apparatus according to claim 1, wherein the statistic information of the partial region includes a histogram calculated based on pixel values of the pixels included in the partial region.

11. The apparatus according to claim 1, wherein the degree of coincidence includes a Euclidean distance between a histogram calculated from the partial region of the first image and a histogram calculated from the partial region of the second image.

12. The apparatus according to claim 1, wherein the degree of coincidence includes an overlap amount between a histogram calculated from the partial region of the first image and a histogram calculated from the partial region of the second image.

13. The apparatus according to claim 1, further comprising:
a display processing unit configured to display, on a display unit, corresponding cross sections in the first image and the second image based on the positions of the cross sections specified by the specifying unit.

14. The apparatus according to claim 1, wherein the statistic information of the partial region includes a histogram calculated based on one of an area of the partial region and a representative value of pixel values of the pixels included in the partial region.

15. The apparatus according to claim 1, wherein each of the cross sections of the first image and the cross sections of the second image is one of a cross section of a cross-sectional image created using a plurality of cross-sectional images and a cross section of a cross-sectional image created by performing image processing for a plurality of cross-sectional images.

16. The apparatus according to claim 1, wherein the division unit divides the region of interest into a plurality of partial regions in accordance with a distance from a pixel of interest included in the region of interest.

17. The apparatus according to claim 1, wherein the specifying unit calculates the evaluation value by setting a weight for each of the partial regions of the first image and the partial regions of the second image based on imaging conditions of the first image and the second image.

18. The apparatus according to claim 1, wherein the specifying unit calculates the evaluation value by setting a weight for cross sections forming the pair of cross-sectional positions, based on imaging conditions of the first image and the second image.

19. The apparatus according to claim 1, wherein the specifying unit calculates the evaluation value by setting a weight according to the number of cross sections forming the pair of cross-sectional positions.

20. The apparatus according to claim 1, wherein the specifying unit compares a body axis direction of the first image with a body axis direction of the second image, and changes, if the body axis directions are different, one of the body axis direction of the first image and the body axis direction of the second image.

21. An image processing method comprising:
dividing, into a plurality of partial regions, a region of interest obtained from each of cross sections of a first image and a second image, each of which has a plurality of cross sections;
calculating, for each of the cross sections of the first image and the second image and each of the partial regions, statistic information of pixels included in the partial region;
calculating a degree of coincidence between the pieces of statistic information for a partial region in the first image and a partial region, corresponding to the partial region, in the second image, in a pair of cross-sectional positions in the first image and the second image; and
specifying positions of corresponding cross sections between the first image and the second image based on comparison between evaluation values each obtained by integrating the degrees of coincidence over the plurality of partial regions.

22. A computer-readable storage medium storing a program for causing a computer to execute steps of an image processing method, the method comprising:
dividing, into a plurality of partial regions, a region of interest obtained from each of cross sections of a first image and a second image, each of which has a plurality of cross sections;
calculating, for each of the cross sections of the first image and the second image and each of the partial regions, statistic information of pixels included in the partial region;
calculating a degree of coincidence between the pieces of statistic information for a partial region in the first image and a partial region, corresponding to the partial region, in the second image, in a pair of cross-sectional positions in the first image and the second image; and
specifying positions of corresponding cross sections between the first image and the second image based on comparison between evaluation values each obtained by integrating the degrees of coincidence over the plurality of partial regions.

* * * * *